(12) United States Patent
Soule

(10) Patent No.: US 6,471,458 B1
(45) Date of Patent: Oct. 29, 2002

(54) MACHINE FOR PERFORATING AND BINDING SHEETS

(75) Inventor: Pierre Soule, Rennes (FR)

(73) Assignee: Fellowes France (FR)

( * ) Notice: Subject to any disclaimer, the term of this patent is extended or adjusted under 35 U.S.C. 154(b) by 0 days.

(21) Appl. No.: 09/622,527

(22) PCT Filed: Feb. 16, 1999

(86) PCT No.: PCT/FR99/00340

§ 371 (c)(1),
(2), (4) Date: Aug. 18, 2000

(87) PCT Pub. No.: WO99/42261

PCT Pub. Date: Aug. 26, 1999

(30) Foreign Application Priority Data

Feb. 19, 1998 (FR) .............................. 98 02235

(51) Int. Cl.[7] ................................. B42B 5/08
(52) U.S. Cl. ............................... 412/38; 412/9; 412/33; 412/39
(58) Field of Search ................ 412/9, 11, 14, 412/18, 19, 33, 38, 39, 40, 37

(56) References Cited

U.S. PATENT DOCUMENTS

| | | | |
|---|---|---|---|
| 3,921,487 A | 11/1975 | Otsuka et al. ............... 83/467 |
| 4,008,501 A | 2/1977 | Cutter | |
| 4,270,970 A * | 6/1981 | Szanto et al. ............ 156/477 B |
| 4,293,366 A * | 10/1981 | Szanto et al. ............ 156/477 B |
| 4,324,013 A * | 4/1982 | Wu .............................. 412/16 |
| 4,833,958 A | 5/1989 | Abildgaard et al. ........... 83/154 |
| 5,007,782 A * | 4/1991 | Groswith, III et al. ....... 412/40 |
| 5,183,361 A | 2/1993 | Ho ............................... 412/16 |
| 5,527,142 A * | 6/1996 | Chih-Kwo ................... 412/38 |
| 5,584,632 A * | 12/1996 | Stiles et al. ................... 412/39 |
| 5,771,768 A * | 6/1998 | Malmstrom .................. 83/571 |
| 5,827,034 A * | 10/1998 | von Rohrscheidt .......... 412/40 |
| 5,931,623 A * | 8/1999 | Hastings et al. ............. 412/39 |
| 6,047,623 A * | 4/2000 | Whiteman et al. ........... 83/618 |
| 6,074,151 A * | 6/2000 | Pas .............................. 412/38 |

FOREIGN PATENT DOCUMENTS

| | | |
|---|---|---|
| BE | 868128 | 12/1978 |
| DE | 689 631 | 3/1940 |
| DE | 24 30 004 | 1/1975 |

* cited by examiner

*Primary Examiner*—A. L. Wellington
*Assistant Examiner*—Monica Carter
(74) *Attorney, Agent, or Firm*—Lerner, David, Littenberg, Krumholz & Mentlik, LLP

(57) ABSTRACT

The invention relates to a machine for punching and binding sheets (F), the machine comprising first means for punching and second means for binding. This machine is characterized by the facts that the first and second means are in the form of blocks (2, 3) that are independent, removable, and interchangeable, and that the punch block (2) is fitted with means (60–63) for adjusting the size of the margin of the sheets (F), i.e. the spacing between the line of holes (P) and the nearest parallel edge.

17 Claims, 4 Drawing Sheets

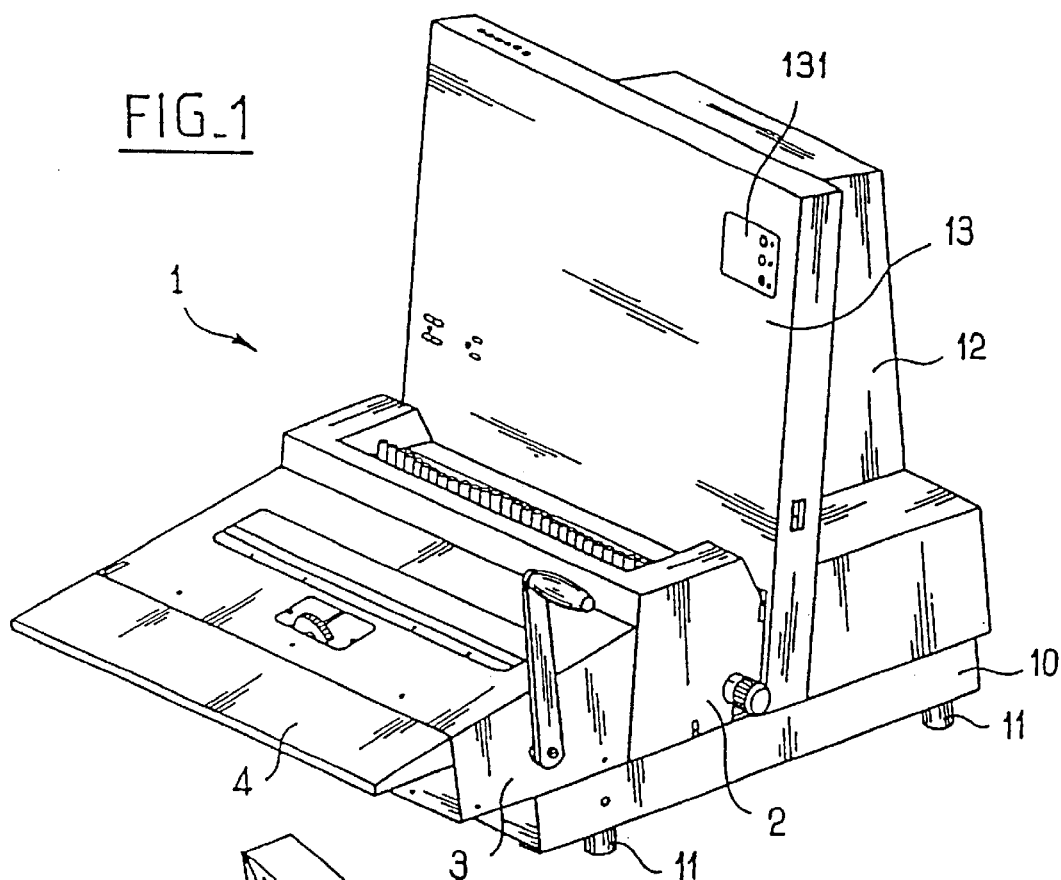
FIG_1
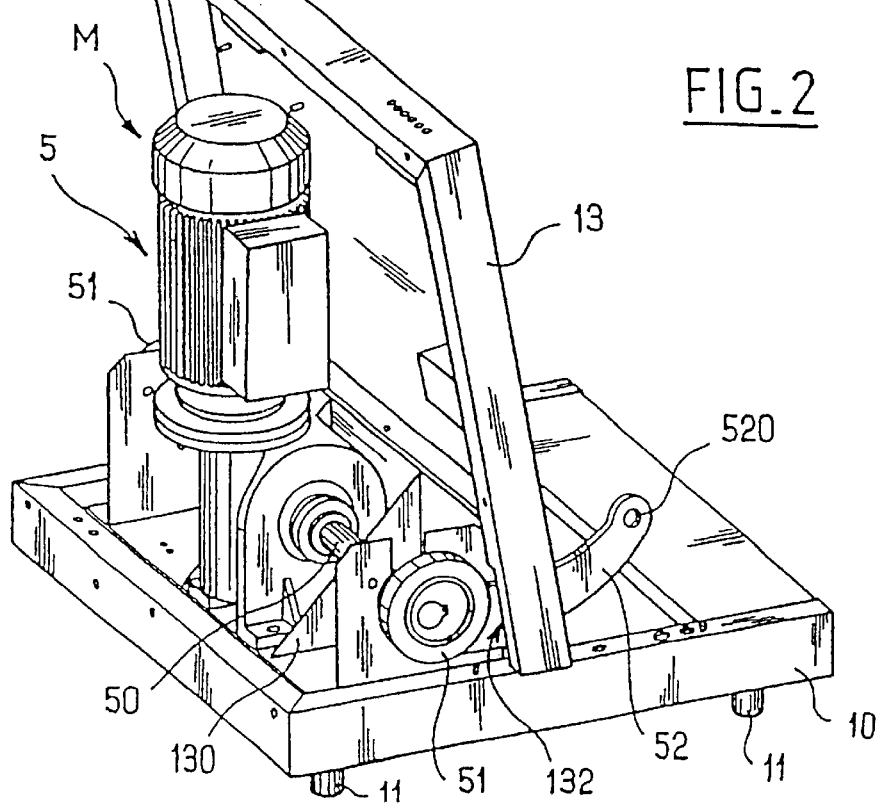
FIG_2

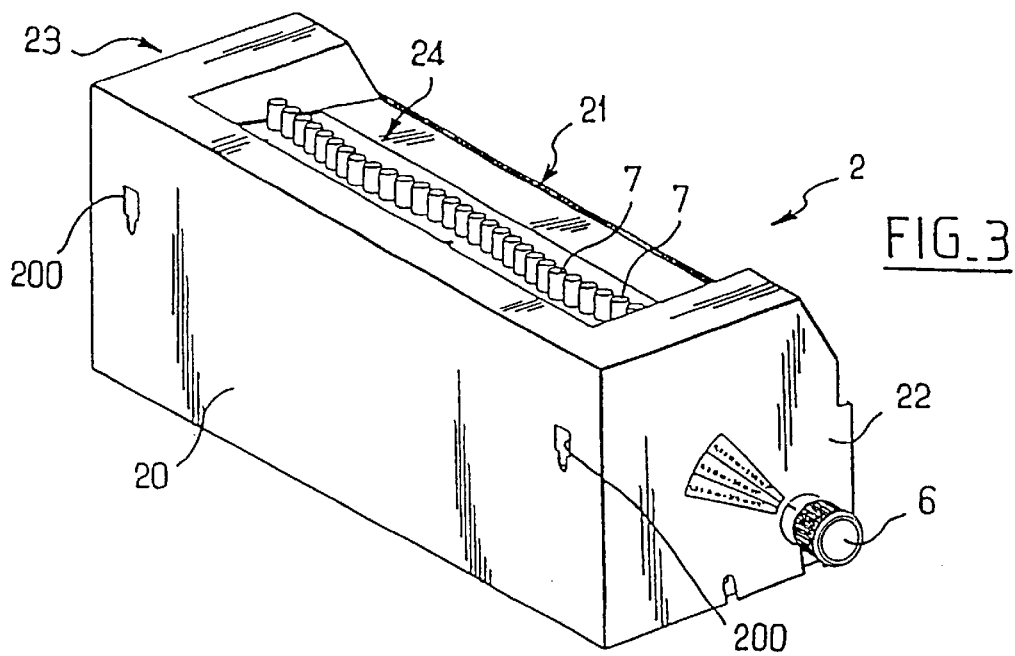
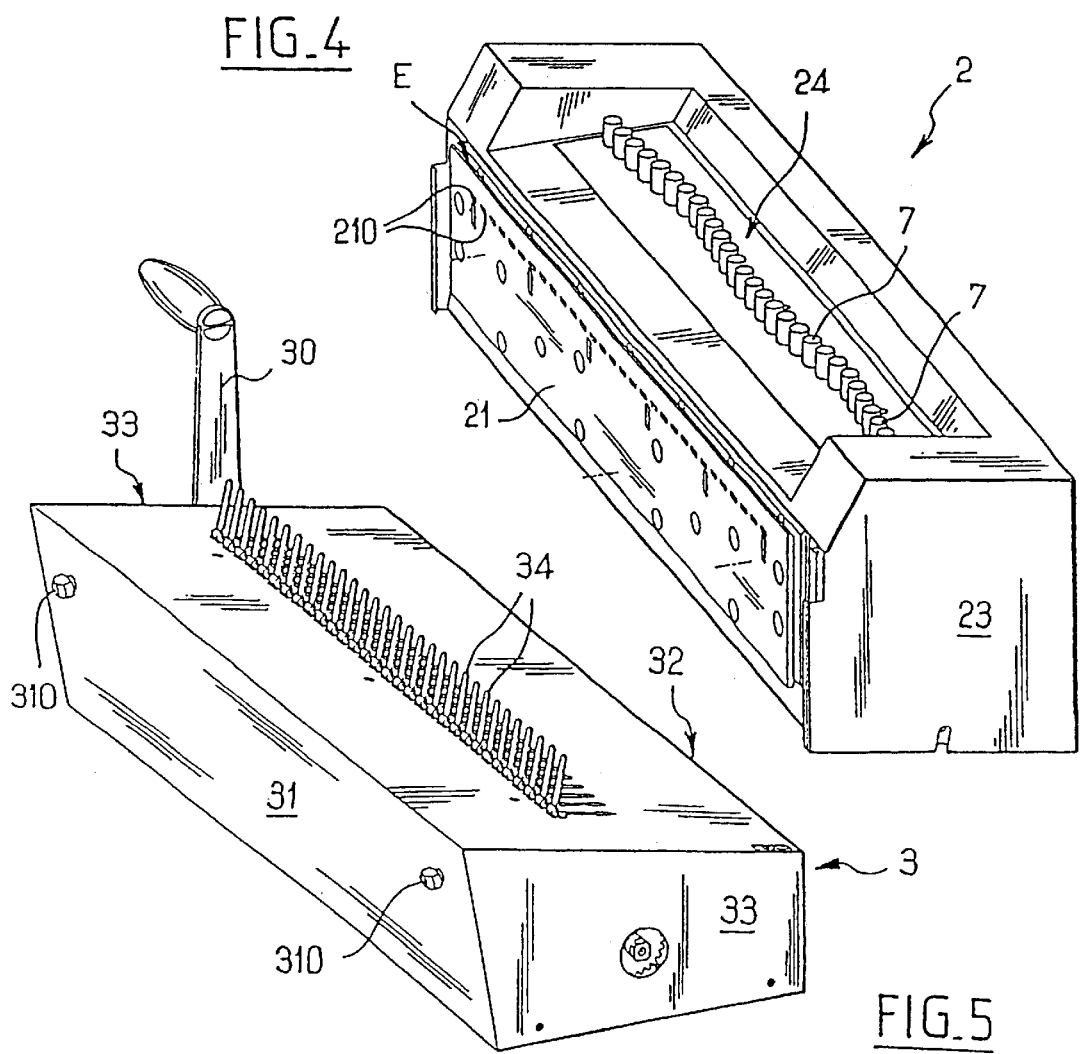

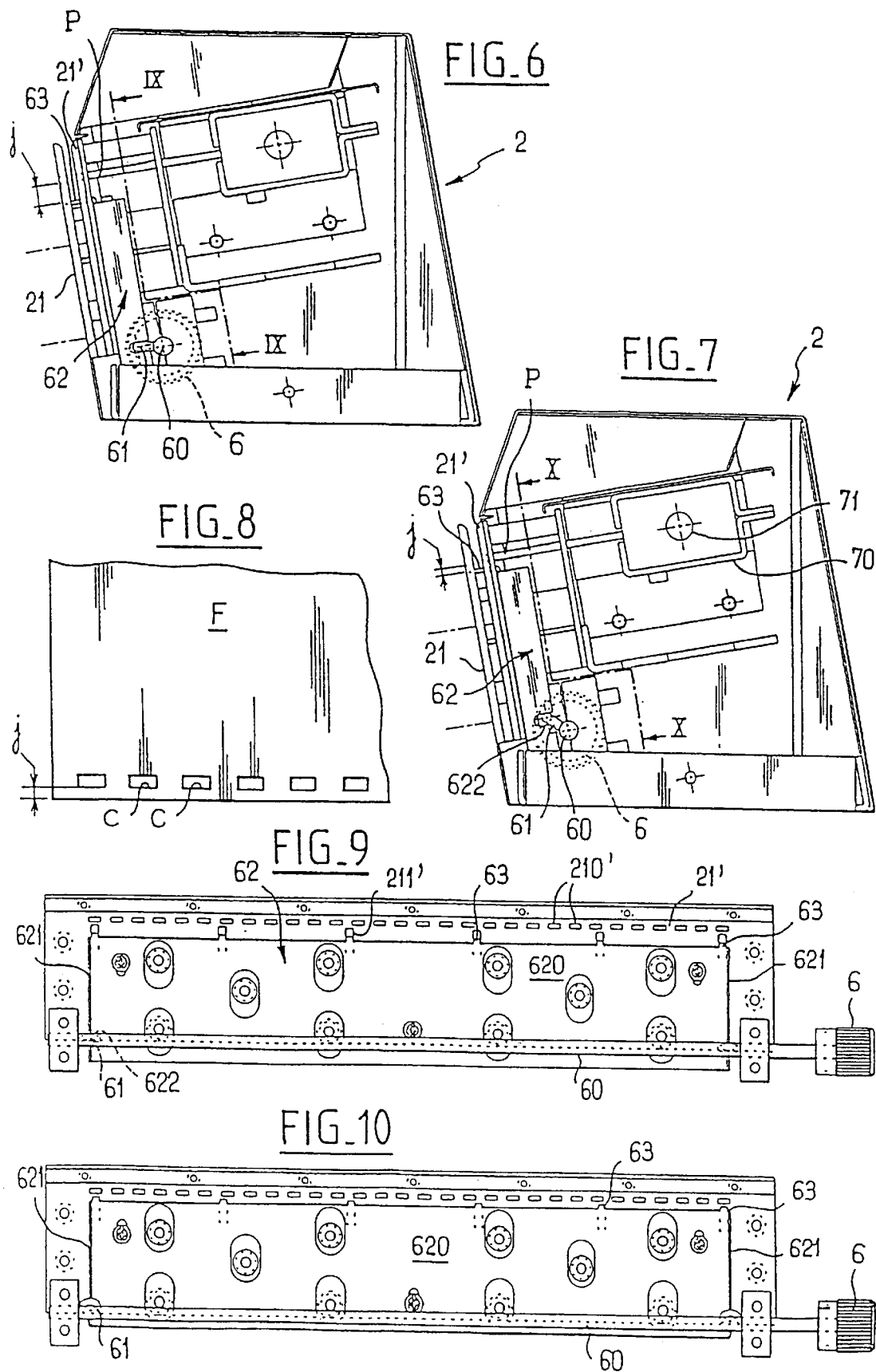

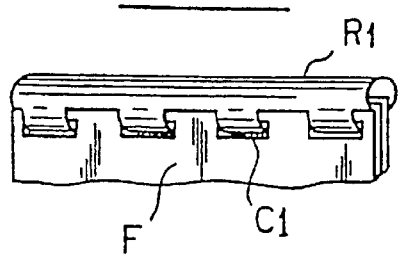
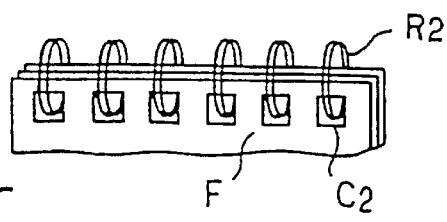
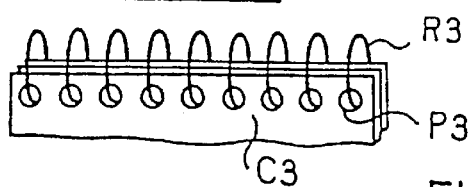
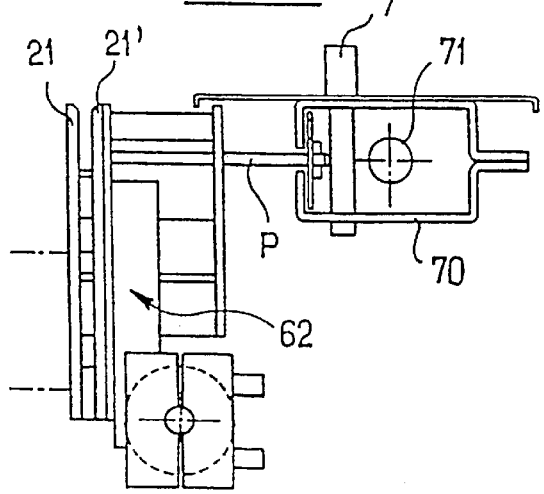
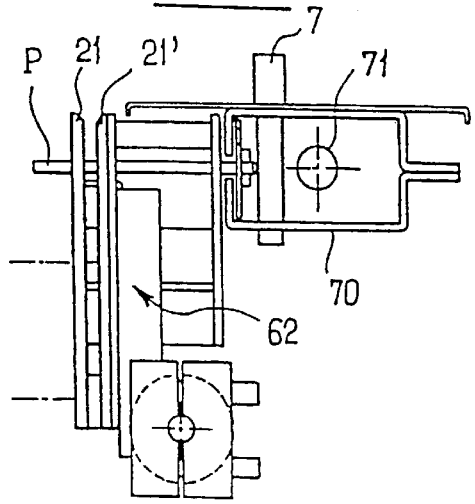
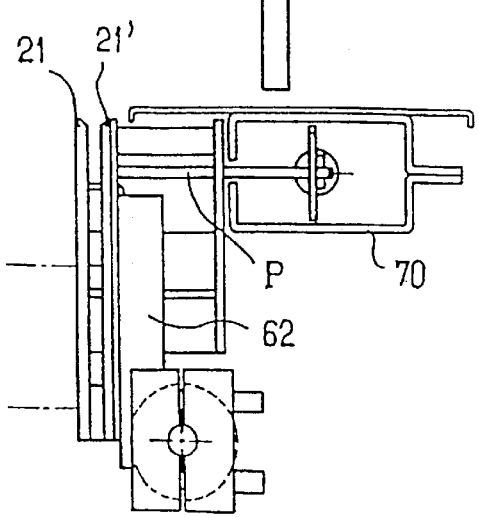

MACHINE FOR PERFORATING AND BINDING SHEETS

BACKGROUND OF THE INVENTION/FIELD OF THE INVENTION

The present invention relates to a machine for punching and binding sheets.

It is particularly but not exclusively intended for professional use.

BACKGROUND OF THE INVENTION

Sheet punches which are normally intended for occasional use are widespread. These are simple machines for punching holes of determined shape, e.g. rectangular, and at predetermined intervals.

When it is desired to make holes of a different shape, e.g. square, it is necessary to use another machine. Naturally this gives rise to additional cost, and using a plurality of machines requires a large amount of space.

In addition, in order to bind sheets together, e.g. by means of a comb or helical binding made of metal, it is necessary to use an additional and independent machine.

That is the reason why compact machines have been proposed that combine both a punch system and a binding system. Nevertheless, any such machine is specific to holes of one particular type.

Thus, document DE-C-689 631 describes a device having both sheet punch means and binding means.

Only the part in which the binding is received for the purpose of being closed on the sheets is interchangeable. In spite of that, the device remains limited to binding documents by means of elements in the form of metal hooks. In any event, overall the punch means and the binding means are not designed to be removable and interchangeable.

Document DE-A-2 430 004 describes a machine for punching sheets in which the assembly formed by a guide plate, a punch guide, and the punches themselves is provided in removable manner.

Other machines have an interchangeable punch system coupled to a specific binding system.

In that case also, as soon as it is desired to use bindings of a different type, it is necessary to have a plurality of machines available.

An object of the present invention is to resolve those problems by proposing a fully versatile machine, i.e. a machine that can operate with different types of hole, with different spacings between holes, and with different bindings.

Another object of the invention is to propose a machine which can, without difficulty, bind a wide variety of thicknesses of sheets.

Yet another object of the invention is to provide a machine that is robust and simple to use.

SUMMARY OF THE INVENTION

This machine for punching and binding sheets and which comprises first means for punching, in the form of a block that is independent, removable, and interchangeable, and second means for binding is characterized by the facts that the second means are also in the form of a block that is independent, removable, and interchangeable, and that the punch block is fitted with means for adjusting the size of the margin of the sheets, i.e. the spacing between the line of holes and the nearest parallel edge, and by the fact that it comprises a base fitted with an approximately vertical transverse partition against which said punch block is placed, while motor means are provided on the opposite side of the partition, which partition has openings through which motion-transferring elements pass between the motor means and the punch block.

Thus, the same machine can receive different punch and binding systems in the form of independent blocks, thereby making it possible to implement multiple assembly combinations.

In addition, the fact that the punch block includes the means for adjusting margin size, makes it possible to bind packets of punched sheets in a variety of thicknesses.

The punch block also includes means for receiving punches such that from one block to another it is possible to have punches of different shapes and sizes.

The purchase price of the machine and its various blocks is necessarily less than that of a plurality of prior art machines. Furthermore, the space occupied by the machine and its "spare" blocks is smaller than that occupied by the corresponding number of conventional machines, each of limited use.

In addition, according to other advantageous but non-limiting characteristics of the invention:

said partition constitutes a bearing surface for the sheets to be punched;

one of the faces of the punch blocks, referred to as a "front" face, has openings for receiving complementary engagement means provided on the rear face of the binding block;

one of the faces of the binding block, referred to as a "front" face, has openings for receiving complementary engagement members provided on the rear face of a sill;

the punch block has a series of punches, at least some of which are designed to be declutchable;

said means for adjusting the size of the margin include an actuator knob projecting from a side face of the punch block; and said knob is secured to a rotary pin fitted with at least one radial tab with actuation of the pin acting via the radial tab to move in translation the support means for sheets.

BRIEF DESCRIPTION OF THE DRAWINGS

Other characteristics and advantages of the invention will appear on reading the following detailed description of a preferred embodiment. The description refers to the accompanying drawings, in which:

FIG. 1 is a perspective view of the machine of the invention, fitted with punch and binding blocks and also with a sill;

FIG. 2 is another perspective view of the FIG. 1 machine, but seen in the opposite direction, and the machine has had its punch and binding blocks removed together with the case for protecting its motor means;

FIG. 3 is a perspective view of a punch block;

FIG. 4 is another perspective view of the FIG. 3 block, but seen in the opposite direction;

FIG. 5 is a perspective view of a binding block;

FIGS. 6 and 7 are views on a vertical and longitudinal section plane of the FIG. 4 punch block, and they serve to show possible positions for the means for adjusting margin size;

FIG. 8 is a fragmentary face view of a sheet that has been punched by a machine of the invention;

FIGS. 9 and 10 are views of the FIG. 4 block seen on section planes IX—IX and X—X of FIGS. 6 and 7;

FIGS. 11A, 11B, and 11C are fragmentary views of blocks of punched sheets, assembled together using different types of binding; and FIGS. 12 to 14 are simplified diagrams of the punch elements of the corresponding punch block, these figures showing how the various moving parts move depending on the positioning of the declutchable punches.

DETAILED DESCRIPTION OF THE PREFERRED EMBODIMENT

The machine of the invention for punching and binding sheets, as shown more particularly in FIG. 1, essentially comprises a base 10 having a transverse partition 13. Motor means 5 occupy one side of the partition, while its opposite side receives a punch block 2 and a binding block, and also a sill 4.

The base 10 is a metal rectangular base having rubber legs 11 in the vicinity of its four corners.

A partition 13 is fixed substantially halfway along the base. The partition extends transversely across the machine and in a direction that is approximately vertical. This partition is made stable in particular by triangular reinforcing pieces 130 which bear against the base.

Motor means 5 are located behind the partition. These means comprise a motor M (e.g. an electric motor) having a vertical axis which drives a transverse and horizontal shaft 50 via appropriate angle take-off means (not shown). The motor is located substantially in the middle of the machine and the shaft 50 extends across the machine to two opposite edges of the base.

At the opposite ends of the shaft, there are provided eccentrics 51 each of which co-operates with a respective angled link 52 having a raised end. The two links occupy parallel vertical planes and extend longitudinally towards the front of the machine, passing through openings 132 provided for this purpose in the partition 13. The raised free end of each link remote from the eccentric 51 carries a through opening 520 to receive a pin, as described below.

Clearly rotary movement of the outlet shaft 50 of the motor M is converted by the eccentrics 51 into longitudinal back-and-forth motion of the links 52. The function of such motion is described below.

On its front face, the partition 13 is provided with a small control panel 131 which makes it possible, e.g. by means of a system of touch-sensitive keys, to switch the motor M on and off and thereby move the pair of links 52. It should be observed that in normal operation of the machine, the drive means 5 are covered by a metal hood 12. Safety means can also be provided which ensure that the motor M cannot be switched on unless it is protected by the above-mentioned hood.

As mentioned above, the base 10 is also designed to receive means for punching and binding sheets, these means being in the form of removable and interchangeable blocks.

Thus, a punch block 2 is designed to occupy a position on the base against the front face of the transverse partition 13.

The block 2 which can be seen more particularly in FIGS. 3 and 4 is substantially in the form of an elongate rectangular parallelepiped with approximately vertical front and back long faces 20 and 21 that are designed to extend across the machine. The face 20 forms an integral portion of a hood for protecting the block, while the opposite wall 21 constitutes an active portion of the block in which openings 210 are provided that are arranged in a horizontal line for punching sheets.

Openings 200 are provided in the front face 20 for receiving complementary members provided on the rear face of a binding block as described below.

As shown in FIGS. 6 and 7, the plate 21 forming the rear face extends parallel to a parallel plate 21' likewise having punch openings 210' passing therethrough and located in register with the preceding openings 210. The gap E between these plates is sufficient to enable them to receive a packet of sheets to be perforated.

The web 620 of a channel-section bar 62 bears against the inside face of the plate 21 and the two parallel flanges 621 thereof extend in respective vertical and longitudinal planes. A small longitudinal cutout 622 is provided in the bottom portion of each flange opening out towards the free end thereof.

Finally, the top edge of the web 620 of the channel-section bar is provided with small tabs 63 curved forwards through 90° and passing through openings 211' provided in the plate 21'. These small tabs extend approximately against the inside face of the outside plate 21. Thus, when sheets are inserted in the above-mentioned gap E, the small tabs 63 together constitute a base against which the sheets bear.

The block 2 also contains a transverse pin 60 which extends horizontally and is guided to rotate about its own axis in appropriate manner. It projects beyond a side face 22 of the block and in this location it carries a knurled drive knob 6. The pin 60 is provided with two small radial tabs 61 which extend in register with the flanges 621 of the bar 62. More precisely, these tabs are engaged in the two above-mentioned cutouts 622.

With reference to FIGS. 6 and 7, it will readily be understood that by rotating the knob 6, the bar 62 can be moved at will in the vertical direction. As a result, it is possible to adjust the distance i between the tabs 63 and the holes 210 and 210' in the plates 21 and 21' through which the punches P of the punch block are to pass.

With reference to FIG. 8, there can be seen a portion of a sheet F which has been punched. The holes, referenced C, are distributed in the form of a line parallel to the edge of the sheet. On this sheet, the above-mentioned distance i represents the size of the margin, i.e. the distance between the line of holes C and the nearest parallel edge.

In this way, if very many sheets are to be punched and bound, then the line of holes must be moved away as far as possible from the corresponding edge so as to be capable of receiving a binding of appropriate diameter.

In the invention, each punch block 2 suitable for use with the machine has its own means for adjusting margin size.

In conventional manner, the machine has declutchable punch means P.

Thus, the punches P which extend transversely and horizontally in a line, are associated with a sliding member 70 having a transverse pin 71 passing therethrough with its ends engaging in the links 52 that are mentioned above. Furthermore, each punch is associated with a declutchable rod 7 which can be removed via the top face 24 of the punch block by being moved vertically in translation.

It will thus be understood on examining FIGS. 12 to 14, that providing the rods are in place on the block, translation movement of the part 70 driven by the back-and-forth movement of the links 52 causes each of the punches P to pass through the plates 21 and 21', thereby punching the sheets.

Nevertheless, when a rod 7 is removed (see FIG. 14), the corresponding punch is not moved so that punch becomes inactive.

Sheet binding means suitable for use with the machine of the invention are likewise provided in the form of blocks 3 that are removable and interchangeable.

FIGS. 1 and 5 show two types of block which are conventional in structure.

Thus, the block of FIG. 5 has a rear face 31 carrying studs for engaging in complementary openings 200 of the punch block 2 and this binding block is manually driven.

On its top face it has fingers 34 that are intended in this case to receive a comb binding. Small hooks are provided facing the tabs 34 so that by tilting the drive handle 30 they are moved in translation to move progressively away from the tabs 34.

The above description relates to a binding block that is to receive comb bindings. Nevertheless, it should be understood that if the binding to be used is of some other type, for example a helical binding, then a suitable block can be put into place on the machine.

Optionally, the block 3 can receive a sill 4 adjacent to its front face for receiving the documents that are to be bound.

The same applies naturally to the punch blocks whose punches can be of different shapes.

Thus, FIGS. 11A to 11C show assemblies of sheets F respectively having holes that are: rectangular, $C_1$; square, $C_2$; or circular, $C_3$. These holes are thus made using the same machine, but with different blocks 2.

Each of these various types of hole is suitable for receiving a different type of binding. Specifically, these bindings are a comb binding $R_1$, a binding $R_2$ made up of C-shaped metal loops, and a helical binding $R_3$.

In addition to being compact, the machine of the invention thus presents the advantage of receiving punch and binding blocks that are removable and interchangeable and that can be adapted to any kind of assembly that it is desired to make.

What is claimed is:

1. A machine for punching and binding sheets (F), the machine comprising first means for punching holes (P), in the form of a punch block that is independent, removable, and interchangeable, and second means for binding in the form of a block that is independent, removable and interchangeable, and that the punch block is fitted with means for adjusting the spacing between a line of holes (P) and a nearest parallel edge of the sheets (F), and comprises a base fitted with an approximately vertical transverse partition against which said punch block is placed, while motor means are provided on an opposite side of the partition, which partition has openings through which motion-transferring element pass between the motor means and the punch block.

2. The machine according to claim 1, wherein said partition constitutes a bearing surface for the sheets (F) to be punched.

3. The machine according to claim 2, wherein said punch block has at least one face and one of the faces of the punch block, referred to as a front face, has openings for receiving complementary engagement means provided on the rear face of the binding block.

4. The machine according to claim 2, wherein the binding block has at least one face and one of the faces of the binding block, referred to as a front face, has openings for receiving complementary engagement members provided on a rear face of a sill.

5. The machine according to claim 2, wherein the punch block has a series of punches, at least some of which are designed to be declutchable.

6. The machine according to claim 2, wherein said means for adjusting the size of the margin include an actuator knob projecting from a side face of the punch block.

7. The machine according to claim 1, wherein said punch block has at least one face and one of the faces of the punch block, referred to as a front face, has openings for receiving complementary engagement means provided on the rear face of the binding block.

8. The machine according to claim 7, wherein the binding block has at least one face and one of the faces of the binding block, referred to as a front face, has openings for receiving complementary engagement members provided on a rear face of a sill.

9. The machine according to claim 7, wherein the punch block has a series of punches, at least some of which are designed to be declutchable.

10. The machine according to claim 7, wherein said means for adjusting the size of the margin include an actuator know projecting from a side face of the punch block.

11. The machine according to claim l, wherein the binding block has at least one face and one of the faces of the binding block, referred to as a front face, has openings for receiving complementary engagement members provided on a rear face of a sill.

12. The machine according to claim 11, wherein the punch block has a series of punches, at least some of which are designed to be declutchable.

13. The machine according to claim 11, wherein said means for adjusting the size of the margin include an actuator knob from a side face of the punch block.

14. The machine according to claim 1, wherein the punch block has a series of punches, at least some of which are designed to be declutchable.

15. The machine according to claim 14, wherein said means for adjusting the size of the margin include an actuator knob projecting from a side face of the punch block.

16. The machine according to claim 1, wherein said means for adjusting the size of the margin include an actuator knob projecting from a side face of the punch block.

17. The machine according to claim 16, wherein said knob is secured to a rotary pin fitted with at least one radial tab with actuation of the pin acting via the radial tab to move in translation a support means for sheets (F).

\* \* \* \* \*

UNITED STATES PATENT AND TRADEMARK OFFICE
CERTIFICATE OF CORRECTION

PATENT NO. : 6,471,458 B1
DATED : October 29, 2002
INVENTOR(S) : Pierre Soule

It is certified that error appears in the above-identified patent and that said Letters Patent is hereby corrected as shown below:

<u>Column 1,</u>
Line 5, cancel "FIELD".
Line 6, cancel "OF THE INVENTION".
Line 7, insert -- 1. Field of the Invention --.
Line 12, "BACKGROUND OF THE INVENTION" should read -- 2. Background of the Invention --.

<u>Column 4,</u>
Line 38, "i" should read -- j --.
Line 44, "i" should read -- j --.

Signed and Sealed this

First Day of April, 2003

JAMES E. ROGAN
*Director of the United States Patent and Trademark Office*